(12) United States Patent
Birnbaum et al.

(10) Patent No.: US 10,504,339 B2
(45) Date of Patent: Dec. 10, 2019

(54) MOBILE DEVICE WITH INSTINCTIVE ALERTS

(71) Applicant: IMMERSION CORPORATION, San Jose, CA (US)

(72) Inventors: David Birnbaum, Oakland, CA (US); Vincent Levesque, Montreal (CA); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 28 days.

(21) Appl. No.: 13/772,682

(22) Filed: Feb. 21, 2013

(65) Prior Publication Data
US 2014/0232534 A1    Aug. 21, 2014

(51) Int. Cl.
*G08B 6/00*    (2006.01)
(52) U.S. Cl.
CPC ..................................... *G08B 6/00* (2013.01)
(58) Field of Classification Search
CPC ....................................................... G08B 6/00
See application file for complete search history.

(56) References Cited

U.S. PATENT DOCUMENTS

| | | | |
|---|---|---|---|
| 6,850,150 B1* | 2/2005 | Ronkainen | 340/7.58 |
| 7,139,722 B2* | 11/2006 | Perrella | G06Q 10/063116 701/533 |
| 8,004,391 B2 | 8/2011 | Cruz-Hernandez | |
| 2002/0054174 A1 | 5/2002 | Abbott et al. | |
| 2008/0133219 A1 | 6/2008 | Doulton | |
| 2008/0252594 A1 | 10/2008 | Gregorio et al. | |
| 2008/0287147 A1* | 11/2008 | Grant et al. | 455/466 |
| 2009/0305744 A1 | 12/2009 | Ullrich | |
| 2010/0123588 A1* | 5/2010 | Cruz Hernandez | 340/573.1 |
| 2010/0191454 A1* | 7/2010 | Shirai | G06Q 10/109 701/533 |
| 2010/0302015 A1* | 12/2010 | Kipman | G06F 3/011 340/407.1 |
| 2011/0102160 A1 | 5/2011 | Heubel et al. | |
| 2011/0264491 A1* | 10/2011 | Birnbaum | G06F 3/016 705/14.4 |
| 2012/0115445 A1 | 5/2012 | Tartz et al. | |
| 2012/0229400 A1 | 9/2012 | Birnbaum et al. | |
| 2013/0198694 A1* | 8/2013 | Rahman | G06F 3/0484 715/864 |
| 2014/0139450 A1* | 5/2014 | Levesque | G08B 6/00 345/173 |

FOREIGN PATENT DOCUMENTS

CN    101193391 A    6/2008
CN    102216876 A    10/2011
(Continued)

*Primary Examiner* — Quan-Zhen Wang
*Assistant Examiner* — Rajsheed O Black-Childress
(74) *Attorney, Agent, or Firm* — Kilpatrick Townsend & Stockton LLP

(57) ABSTRACT

A haptically enabled system receives information and determines that a user of the system should be notified of the information. The system further receives and analyzes inputs to determine a context of the user. The system then generates an instinctive alert based on the context, where the instinctive alert is configured to impart a desired emotion on the user. The system then displays the instinctive alert based on the context.

23 Claims, 2 Drawing Sheets

(56) References Cited

FOREIGN PATENT DOCUMENTS

| | | | |
|---|---|---|---|
| CN | 102804105 | A | 11/2012 |
| EP | 1873619 | A1 | 1/2008 |
| JP | 2007269268 | A | 10/2007 |
| JP | 2008-120164 | A | 5/2008 |
| JP | 2009-265818 | A | 11/2009 |

\* cited by examiner

MOBILE DEVICE WITH INSTINCTIVE ALERTS

FIELD

One embodiment is directed to mobile devices, and in particular to mobile devices that generate alerts for a user.

BACKGROUND INFORMATION

Portable/mobile electronic devices, such as mobile phones, smartphones, camera phones, cameras, personal digital assistants ("PDAs"), etc., typically include output mechanisms to alert the user of certain events that occur with respect to the devices. For example, a cell phone normally includes a speaker for audibly notifying the user of an incoming telephone call event. The audible signal may include specific ringtones, musical ditties, sound effects, etc. In addition, cell phones may include display screens that can be used to visually notify the users of incoming phone calls.

In some mobile devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects for alerts or other uses, many devices utilize some type of actuator or haptic output device. Known actuators used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Haptic output devices may also be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface, devices that provide projected haptic output such as a puff of air using an air jet, etc. However, the above-described haptic effects are generally designed to alert the user to events rather than actually influence the user's emotional response.

SUMMARY

One embodiment is a haptically enabled system that receives information and determines that a user of the system should be notified of the information. The system further receives and analyzes inputs to determine a context of the user. The system then generates an instinctive alert based on the context, where the instinctive alert is configured to impart a desired emotion on the user. The system then displays the instinctive alert based on the context.

DETAILED DESCRIPTION

One embodiment is a mobile device that generates instinctive alerts. The mobile device receives information to be delivered to a user of the mobile device, and uses sensory inputs to determine a current context, including in some situations the current mood and emotion of the user. The mobile device then generates an instinctive alert that engages the user in order to influence the emotion of the user. For example, to create a sense of urgency for a user that is late for a meeting, the device can generate a haptic effect that simulates a heartbeat, and the rate of the heartbeat can be gradually increased to trigger an increasing sense of urgency to the user.

In some embodiments, the mobile device is aware of ambient and contextual information and can respond accordingly. For example the device may be aware that the user is in an agitated mood so its adjusts its alerts correspondingly, or the device may be aware that the user is late and generates alerts that simulate that the device is fidgeting in a nervous way (i.e., faster "pulse" to simulate a heartbeat, etc.). Further, a specific theme can automatically be applied depending on the context of the situation (e.g., late, in a meeting, etc.).

Figure 1:
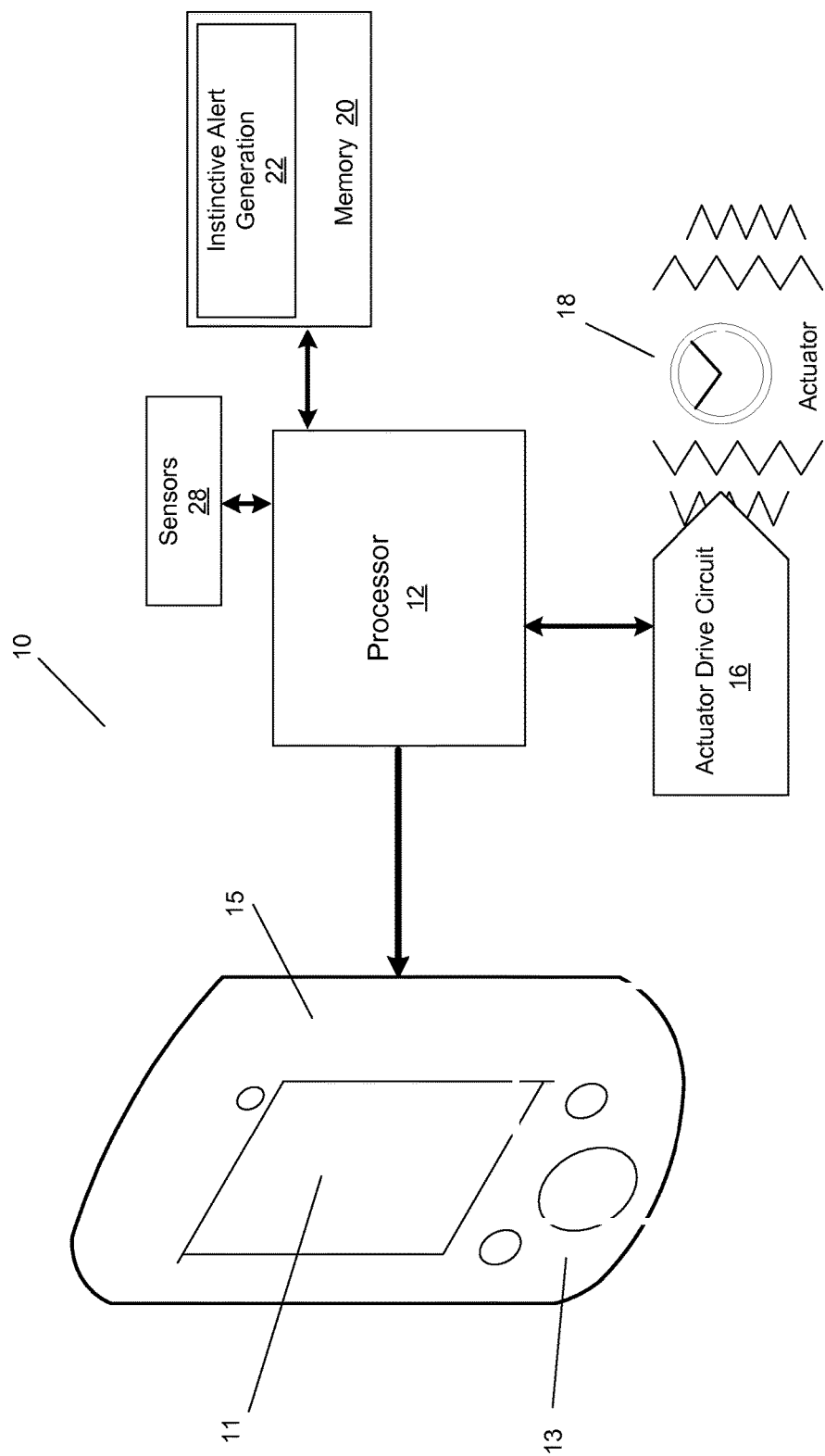
FIG. 1 is a block diagram of a haptically-enabled mobile device or system that can implement an embodiment of the present invention.

FIG. 1 is a block diagram of a haptically-enabled mobile device or system 10 that can implement an embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11 or on any other part of system 10.

The haptic feedback system includes a processor or controller 12. Coupled to processor 12 is a memory 20 and an actuator drive circuit 16, which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12, such as operating system instructions. Among the instructions, memory 20 includes an instinctive alert generation module 22 which is instructions that, when executed by processor 12, generate instinctive alerts, as disclosed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet, gaming console, etc., or may be any other type of device that provides a user interface and includes a haptic effect system that includes one or more actuators. The user interface may be a touch sensitive surface, or can be any other type of user interface such as a mouse, touchpad, mini-joystick, scroll wheel, trackball, game pads or game controllers, etc.

Actuator 18 may be any type of actuator, including an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Although device 10 illustrates an actuator 18 that is used to create vibratory haptic feedback or instinctive alerts, output devices may also be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface, devices that provide projected haptic output such as a puff of air using an air jet, etc.

Actuator 18 is used in one embodiment to display feedback/alerts in response to sensed information. The alerts can be generated by actuator 18 or by other elements of system 10, and could take several forms depending on the application, including haptic, audio or video data. The alerts could include a wide range of effects and technologies, including vibrations, deformation, squeezing, poking, stretching, surface friction, heat, etc. The alerts could also be produced by the device itself (e.g., a mobile phone) or by wearable accessories (e.g., a bracelet, a pair of glasses, shoes, a belt, etc.) or by other remote accessories (e.g., car keys, laptop computers, music players, or any other haptically enabled devices).

System 10 further includes one or more sensors 28. Sensors 28 provide sensor data and device sensor signals to processor 12, such as whole device acceleration, gyroscopic information or ambient information. Device sensor signals may be any type of sensor input enabled by a device, such as from an accelerometer or gyroscope, or any type of ambient sensor signal such as from a microphone, photometer, thermometer or altimeter, or any type of bio monitor such as skin or body temperature, blood pressure ("BP"), heart rate monitor ("HRM"), electroencephalograph ("EEG"), or galvanic skin response ("GSR"), or information or signals received from a remotely coupled device.

Active or ambient device sensor data from sensors 28 may be used to modify the instinctive alerts based any number of factors relating to a user's environment or activity. For example, an accelerometer device sensor signal may indicate that a user is engaging in physical activity such as walking or running, so the pattern and duration of the instinctive alert should be modified to be more noticeable to the user. In another example, a microphone sensor signal may indicate that a user is in a noisy environment, so the amplitude or intensity of the instinctive alert should be increased. Sensor data may also include virtual sensor data which is represented by information or signals that are created from processing data such as still images, video or sound. For example, a video game that has a virtual racing car may dynamically change an alert/haptic effect based the car velocity, how close the car is to the camera viewing angle, the size of the car, and so on.

Sensors 28 are capable of sensing a range of information about the current mood of the user of system 10 and context that it is operating in. The information received by system 10 by sensors 28, or by other interfaces to data over various data networks or data sources (e.g., the Internet, a corporate intranet, cellular networks, Wi-Fi networks, etc.), are used to generate instinctive alerts and may include the following, depending on functionality:

Knowledge databases: Information may be extracted from organized knowledge databases. This includes, for example, an online calendar with information about a user's meetings as well as a customer relationship management ("CRM") system with information about a company's customers.

Historical data: System 10 may be able to collect or consult a history of relevant information, for example to learn sensor readings associated with a certain user activity or the most frequently selected transport mode for a given trip.

Transit information: System 10 may incorporate transit information and algorithms in order to calculate the time required to perform a certain trip based on location, time of day, current and projected traffic, weather conditions, etc.

Biometric sensors: Biometric sensors such as heart rate monitors, GSR sensors or blood pressure sensors can be used to monitor the user's emotional state in real time.

Cameras and microphones: Cameras and microphones can be used to analyze the user's immediate environment. For example, the analysis of this audio-visual data can indicate whether the user is inside or outside, whether the user is talking and to whom, whether the environment is loud or visually distracting, whether the user is moving or still, whether the user is driving or taking public transport, etc.

Equipment monitoring: Equipment, and in particular electronic devices, can be monitored to infer the user's current primary task. A computer can for example be monitored to know which application is being interacted with. The state of different devices, such as a television or playback device, can similarly be monitored to understand if the user is watching a movie or engaged in some other activity.

Accelerometers, GPS: System 10 can use accelerometer and GPS data to estimate the level of activity of the user and in some cases the activity being performed. For example, an accelerometer will show more activity while on public transport rather than sitting on an office chair.

Data such as the above from sensors 28 and other sources is analyzed and fused by system 10 to provide a better understanding of the user's mood and context.

As discussed, system 10 in one embodiment generates "instinctive reminders" or "instinctive alerts" that comprise instinctively communicating a sense of urgency to a user by simulating an emotional state on a mobile device or otherwise triggering an appropriate response at a subconscious level. For example, an instinctive alert can communicate the urgency of leaving for an important meeting, based on the time remaining and predicted time required for transit. Further, embodiments can generate instinctive alerts that match the current context or mood of the user so as to minimize distraction. A subtle nudge would for example be given while a user is relaxing in a quiet environment.

As an example of an instinctive alert generated by one embodiment of the invention, assume the user of system 10 is at the office and has an important offsite meeting in the afternoon. System 10 is a mobile smartphone that acts as a smart personal assistant, keeping track of all information required to get the user to the meeting on time. It communicates with the user in an instinctive, non-disruptive manner, giving impetus to the user to act as necessary without the user's explicit, conscious knowledge.

System 10 in one embodiment is able to sense, through sensors 28 and other sources, a range of information relevant to its task. Specifically, system 10 may be aware of:

- The time left before the meeting and an estimate of the time required for transit. This requires knowledge of the user's agenda as well as trip planning information based on location, time of day, traffic, weather, etc. It also requires knowledge of the user's most likely transportation mode based on explicit input or past data.
- The safety margin appropriate in the current context. System 10 could, for example, delay notification if it is aware that the user is currently in an important meeting or engaged in a conversation. This requires knowledge of the error margin on the transit time as well as sensing of the current context based on any data sources available.
- Monitoring of progress towards the goal. System 10 could, for example, monitor the user's actions and determine whether the user had taken any steps towards reaching the meeting, such as leaving the office. This requires in one embodiment sensing of the current context, with emphasis on specific events of relevance to the goal.

With above information, system 10 can provide whatever feedback/alert that is determined to be necessary to get the user to the destination. The feedback in one embodiment provides this information in a non-intrusive, instinctive manner such that the user is naturally prompted to perform the require actions without being consciously aware of the device notifications.

System 10, in the form of a smartphone in one embodiment, projects its emotional state to the user through the instinctive alerts. Specifically, the phone can produce feedback that communicates its nervousness or sense of urgency in a natural and intuitive manner, as nonverbal communication with a human assistant would. The emotional state of the device can be felt intuitively and unconsciously by the user, triggering the correct reaction. The user may also tend to naturally mimic the device's emotional state, producing a similar reaction. This can be accomplished in several ways:

- The rate of a heartbeat increases with urgency. This heartbeat is produced by a sequence of vibration pulses generated by actuator 18 (e.g., 50 ms pulses of vibrations at 250 Hz). This heartbeat could also be modeled on measurements of sounds or vibrations from a real heartbeat. The vibration could be displayed by the phone (e.g., in the user's pocket) or at another body location often associated with heartbeats, such as the wrist or chest. Alternatively, the heartbeat could be displayed with a similar train of pulses on a wristband that tightens and expands, or a phone enclosure that shrinks and expands.
- The breathing rate increases with urgency. This effect could be produced in a similar manner as the heartbeat, with a haptic pattern following a typical respiration profile: gradual increase in intensity, followed by a sudden drop.
- An abstract signal increases in rate with urgency. A haptic signal, such as a vibration, can be designed to communicate urgency without necessarily having a realistic feel. For example, the time between bursts of vibration could decrease with urgency.

The phone produces a subtle cue to entice the user to act or attract the user's attention to a reminder in one embodiment as follows:

- Vibrators in the sole of the user's shoes or on the user's legs create a subtle tingling sensation, making the user feel like getting up or moving.
- The track pad on the user's laptop or touchscreen 11 become slightly uncomfortable to the touch, suggesting that the current task should be abandoned. This could be done with vibrations or surface friction (e.g., ESF). Similarly, the user's chair could begin to slightly vibrate to suggest instability and the need to leave.
- The user's clothes feel tighter, making the user slightly uncomfortable and increasing the user's stress level. This could be done, for example, by slightly tightening the user's belt.
- Objects associated with the user's meeting vibrate slightly to attract the user's attention. For example, the user's car keys or the user's bus pass could vibrate slightly in the user's pocket, as if calling the user.
- The user's phone vibrates slightly as the user's attention falls on something related to the meeting such as looking outside, at the door or at the user's car.
- The user's phone gradually gets warmer as the urgency increases, giving the user a subtle cue and perhaps increasing the user's stress level by making the user uncomfortable.

As discussed, in one embodiment system 10 determines a current "mood" of the user in order to tailor the instinctive alert. As an example, the user of system 10 may be relaxing quietly in their living room, watching a movie. System 10 receives a notification that it believes the user should know about. It is aware of the user's mood, however, and therefore chooses to notify the user with a subtle nudge that is sufficient to get the user's attention but appropriate for this context.

System 10 can sense the mood of the user either directly or indirectly. Direct measurement could include the use of biometric sensors to capture the user's level of arousal or the use of a camera to analyze the user's facial expressions, and infer the user's emotional state. The user's mood can also be inferred indirectly by sensing the context and environment: noise level, environmental vibrations (e.g., a bus), light level, presence of other people, movement, known activities (e.g., television), etc. This information could be analyzed to classify the mood into a certain set of possibilities (e.g., sleeping, relaxing, working, sports). It could also be reduced to a simple numerical value for arousal.

System 10 then uses this mood information in one embodiment in order to determine the appropriate feedback/ instinctive alert to provide. In one relatively basic embodiment, the intensity of the alert can be reduced or increased based on the user's arousal. In more sophisticated embodiments, the feedback could be carefully selected based on the exact mood and context. For example:

The mechanism used for feedback can be selected based on the current load of the different senses. For example, notification would be provided with vibration while the user's vision and hearing are occupied with a movie.

The intensity of a haptic effect increases with arousal and ambient distractions. For example, a stronger vibration may be used while the user is running than while the user is quietly reading a book.

Biosensors can be used to evaluate the success of an alert/notification and apply corrections. A notification that does not lead to any reaction can be deemed to have failed, and repeated with stronger intensity. A notification that startles the user, on the other hand, can be noted as inappropriate and the intensity reduced when this context presents itself again.

The haptic feedback/instinctive alert can vary based on several parameters:

Amplitude. The amplitude or intensity of an effect can be reduced to make it more subtle. For example, the intensity of a vibration or the travel of a tightening belt can be reduced.

Profile. The profile of a driving signal can vary so as to make effects sharper or smoother. For example, a vibration will feel softer if produced with sinusoidal rather than square periodic signals.

Body part. Certain body parts are more sensitive than others. Receiving haptic feedback is also more typical at some locations than others. The body location at which a stimulus is received can therefore change how startling it is. The body part can also vary based on the context—e.g., avoid vibrating on the thighs while biking.

Mode of stimulation. Several technology types are possible for haptic feedback (e.g., vibration, temperature change, deformation, etc.), each with different effects. Vibrations could for example be more startling than tightening against the wrists.

Further, using networking, alerts can be transmitted to other related users. For example, assuming system 10 has access to a shared calendar that includes a scheduled meeting. An alert can be sent to each user that is scheduled to attend the meeting, and each alert can be tailored to the context/mood of each user. For instance, if one user is on their way to the meeting in a timely fashion, the alert can be short and mild. If another user is late, the alert for that user will impart a sense of urgency. The alerts can be sent from system 10 to a haptically enabled device carried or worn by each user using any type of network transmission methods.

Figure 2:
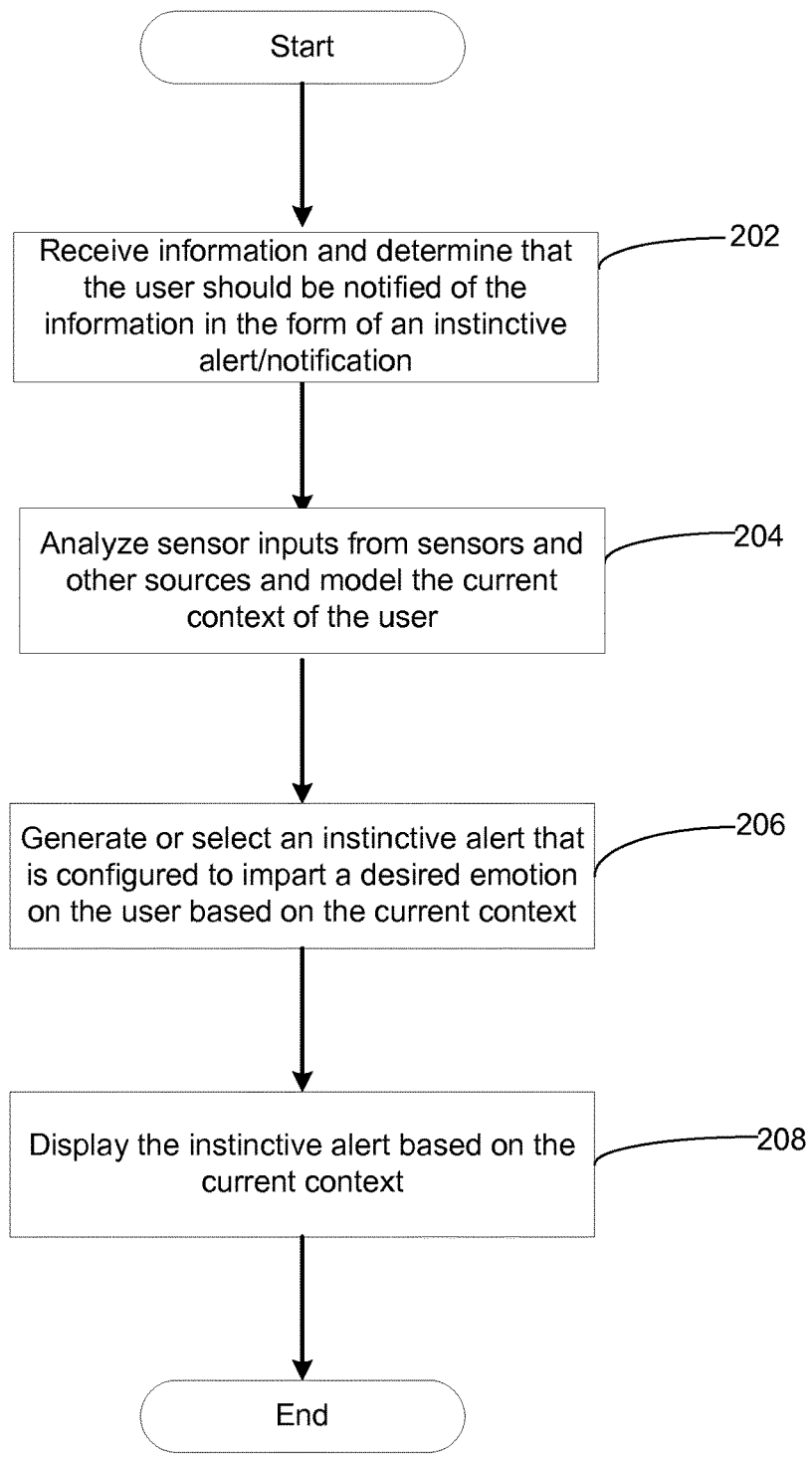
FIG. 2 is a flow diagram of the functionality of the instinctive alert generation module and the system of FIG. 1 when generating instinctive alerts in accordance with one embodiment.

FIG. 2 is a flow diagram of the functionality of instinctive alert generation module 22 and system 10 of FIG. 1 when generating instinctive alerts in accordance with one embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, system 10 receives information and determines that the user should be notified of the information in the form of an instinctive alert/notification. System 10 may have previously determined that the user should be notified of the information. Examples of the information include an upcoming meeting or other event that is about to begin At 204, system 10 analyzes sensor inputs from sensors 28 and other sources and models the current context of the user. Examples of the current context include current location, time and date, mood of the user, etc.

At 206, an instinctive alert that is configured to impart a desired emotion on the user is generated or selected based on the current context. The instinctive alert can vary based on the current context. For example, if the instinctive alert is a haptic effect, the parameters of the haptic effect, such as frequency and magnitude, can be varied. The instinctive alert can be selected based on a theme. For example, if the user is late for a meeting, an "urgent" instinctive alert can be selected to represent an urgency emotion. The instinctive alert can be displayed in a multi-modal fusion (e.g., haptics, sound and audio).

At 208, the instinctive alert is displayed based on the current context. For example, the location of the instinctive alert and/or the mechanism that displays the instinctive alert (e.g., a phone, a wearable device, etc.) will vary depending on the context.

As disclosed, instinctive alerts that impart an emotion on a user are generated and displayed in response to sensor inputs and other information. The instinctive alerts can be in the form of vibratory haptic effects that can interact directly with a user's body.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of operating a haptically enabled device, the method comprising:
receiving information;
determining that a user of the device should be notified of the information;
receiving inputs including a plurality of sensor data, the sensor data including data for determining an arousal of the user, an environment in which the user is in, and physical activity of the user;
analyzing the inputs to determine a mood of the user and a context of the user, the mood of the user being associated with the arousal of the user, and the context of the user being associated with the environment in which the user is in and the physical activity of the user;
generating an instinctive alert to notify the user of the information based on the mood and the context, wherein the instinctive alert is configured to communicate a sense of urgency to the user;
displaying the instinctive alert.

2. The method of claim 1, wherein the displaying comprises generating a vibratory haptic effect that simulates a breathing rate, and the breathing rate increases based on the sense of urgency.

3. The method of claim 1, wherein the displaying comprises generating a vibratory haptic effect that simulates a heartbeat, and the sense of urgency is imparted through changing a rate of the heartbeat.

4. The method of claim 3, wherein the rate of the heartbeat is changed by changing a parameter of the vibratory haptic effects, the parameter comprising at least one of magnitude, frequency or duration.

5. The method of claim 1, wherein the inputs comprise a calendar of the user comprising appointments and corresponding locations of the appointments, and the context comprises a time difference between a current time and a time of an upcoming appointment, the time difference based on a predicted time for transit to a corresponding location for the upcoming appointment and the sense of urgency is based on the time difference.

6. The method of claim 1, wherein the displaying further comprises at least one of: deformation, squeezing, poking, stretching, surface friction or heat.

7. The method of claim 1, wherein:
the sensor data includes biometric sensor data, accelerometer data, global positioning system (GPS) data, camera data, and microphone data;
the biometric sensor data is analyzed to determine the arousal of the user;
the accelerometer data and the GPS data are analyzed to determine the physical activity of the user; and
the camera data and the microphone data are analyzed to determine the environment.

8. The method of claim 7, wherein the biometric sensor data provide feedback after the instinctive alert is displayed, the feedback comprising whether the sense of urgency was imparted on the user.

9. The method of claim 1,
wherein the user is associated with a plurality of remote haptically enabled devices that are in communication with the haptically enabled device;
wherein each of the plurality of remote haptically enabled devices is in contact with the user at a different body location;
wherein the plurality of remote haptically enabled devices comprise wearable devices worn by the user;
wherein different body locations where remote haptically enabled devices are in contact comprise at least two or more of a wrist, a leg, a hand, a foot or a head; and
wherein the method further comprises:
determining one of the plurality of remote haptically enabled devices on which to display the instinctive alert based on the mood, the context and the locations on the user where the wearable devices are worn.

10. The method of claim 1, wherein the sense of urgency of the instinctive alert substantially matches the mood of the user.

11. The method of claim 1, wherein the sense of urgency of the instinctive alert is substantially different from the mood of the user.

12. A non-transitory computer-readable medium having instructions stored thereon that, when executed by a processor, cause the processor to generate alerts on a device, the instructions comprising:
receiving information;
determining that a user of the device should be notified of the information;
receiving inputs including a plurality of sensor data, the sensor data including data for determining an arousal of the user, an environment in which the user is in, and physical activity of the user;
analyzing the inputs to determine a mood of the user and a context of the user, the mood of the user being associated with the arousal of the user, and the context of the user being associated with the environment in which the user is in and the physical activity of the user;
generating an instinctive alert to notify the user of the information based on the mood and the context, wherein the instinctive alert is configured to communicate a sense of urgency to the user;
displaying the instinctive alert.

13. The computer-readable medium of claim 12, wherein the displaying comprises generating a vibratory haptic effect that simulates a breathing rate, and the breathing rate increases based on the sense of urgency.

14. The computer-readable medium of claim 12, wherein the displaying comprises generating a vibratory haptic effect that simulates a heartbeat, and the sense of urgency is imparted through changing a rate of the heartbeat.

15. The computer-readable medium of claim 14, wherein the rate of the heartbeat is changed by changing a parameter of the vibratory haptic effects, the parameter comprising at least one of magnitude, frequency or duration.

16. The computer-readable medium of claim 12,
wherein the user is associated with a plurality of remote haptically enabled devices that are in communication with the haptically enabled device;
wherein each of the plurality of remote haptically enabled devices is in contact with the user at a different body location;
wherein the plurality of remote haptically enabled devices comprise wearable devices worn by the user;
wherein different body locations where remote haptically enabled devices are in contact comprise at least two or more of a wrist, a leg, a hand, a foot or a head; and
wherein the instructions further comprise:
determining one of the plurality of remote haptically enabled devices on which to display the instinctive alert based on the mood, the context and the locations on the user where the wearable devices are worn.

17. The computer-readable medium of claim 12, wherein the displaying comprises at least one of: deformation, squeezing, poking, stretching, surface friction or heat.

18. The computer-readable medium of claim 12, wherein:
the sensor data include biometric sensor data, accelerometer data, global positioning system (GPS) data, camera data and microphone data,
the biometric sensor data is analyzed to determine the arousal of the user;
the accelerometer data and the GPS data are analyzed to determine the physical activity of the user; and
the camera data and the microphone data are analyzed to determine the environment.

19. The computer-readable medium of claim 18, wherein the biometric sensor data provide feedback after the instinctive alert is displayed, the feedback comprising whether the sense of urgency was imparted on the user.

20. A mobile system, comprising:
an actuator; and
a processor, coupled to the actuator, adapted to:
receive information,
determine that a user should be notified of the information;
receive inputs including a plurality of sensor data, the sensor data including data for determining an arousal of the user, an environment in which the user is in, and physical activity of the user;
analyze the inputs to determine a mood of the user and a context of the user, the mood of the user being associated with the arousal of the user, and the context of the user being associated with the environment in which the user is in and the physical activity of the user;

generate an instinctive alert to notify the use of the information based on the mood and the context, wherein the instinctive alert is configured to communicate a sense of urgency to the user; and display the instinctive alert using the actuator.

21. The mobile system of claim 20, wherein the instinctive alert comprises a vibratory haptic effect that simulates a breathing rate, and the breathing rate increases based on the sense of urgency.

22. The mobile system of claim 20, further comprising:
a biometric sensor;
an accelerometer;
a global positioning system (GPS) sensor;
a camera; and
a microphone,
wherein biometric sensor data is analyzed to determine the arousal of the user,
wherein accelerometer data and GPS data are analyzed to determine the physical activity of the user, and
wherein camera data and microphone data are analyzed to determine the environment.

23. The mobile system of claim 22, further comprising:
a plurality of haptically enabled devices associated with the user, each of the plurality of haptically enabled devices being in contact with the user at a different body location,
wherein each of the plurality of haptically enabled devices is in contact with the user at a different body location,
wherein the plurality of haptically enabled devices comprise wearable devices worn by the user,
wherein different body locations where the plurality of haptically enabled devices are in contact comprise at least two or more of a wrist, a leg, a hand, a foot or a head, and
wherein the processor is further adapted to:
determine one of the plurality of haptically enabled devices on which to display the instinctive alert based on the mood, the context and the locations on the user where the wearable devices are worn.

* * * * *